UNITED STATES PATENT OFFICE 2,509,269

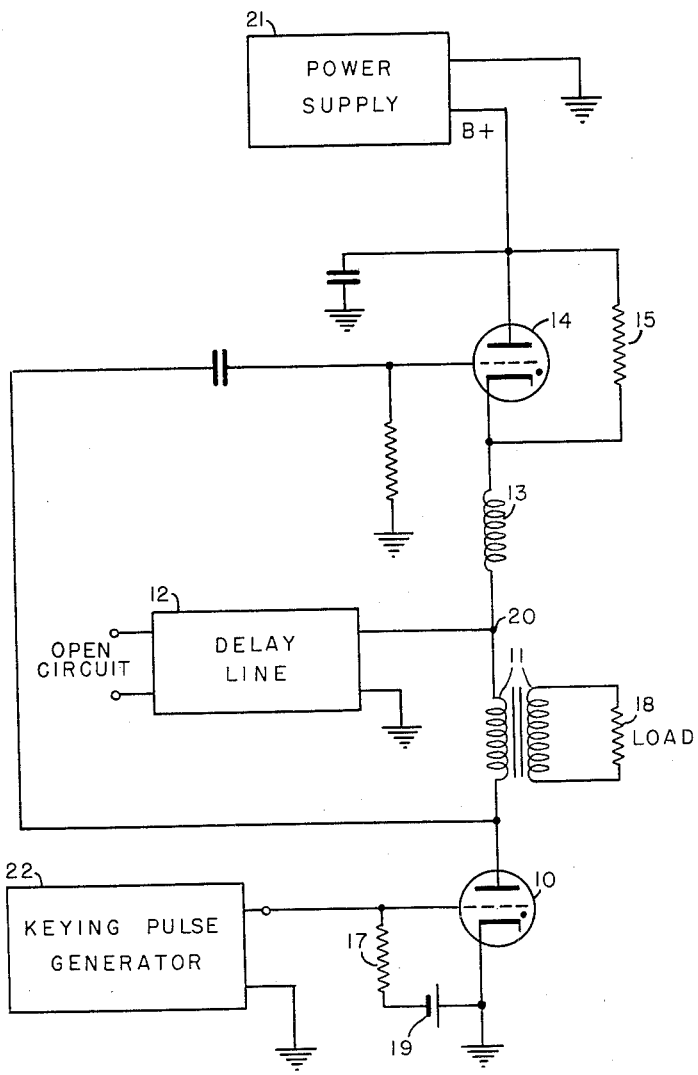

PULSE AMPLITUDE REGULATION

Thomas C. Hana, Great Neck, N. Y., assignor, by mesne assignments, to the United States of America as represented by the Secretary of the Navy Application July 17, 1946, Serial No. 684,381

2 Claims. (Cl. 171—97)

This invention relates to a system of voltage regulation and more specifically to a system of pulse voltage regulation in connection with a thyratron pulse circuit.

It is an object of this invention to provide a pulse circuit which will give a pulse of constant amplitude regardless of the repetition rate of the pulse.

It is a further object of this invention to provide a pulse circuit which will give a pulse of constant amplitude under variable operating conditions even though the voltage regulation of the power supply is poor.

Other objects and advantages of the invention will be apparent from the following detailed description when taken in conjunction with the accompanying drawing in which the single figure thereof represents a preferred embodiment of the invention.

In accordance with the present invention, a pulse modulator circuit is contemplated which will deliver a pulse of constant amplitude under variable conditions involving changes in pulse repetition rate and changes in the available supply voltage resulting from poor voltage regulation of the power supply. This is accomplished by allowing a delay line which forms the pulse shape to discharge slowly through a resistance between pulses. Discharge of the delay line between pulses is necessitated by the fact that the delay line is overcharged immediately after the pulse period by virtue of its connection in a series resonant circuit during the charging period, as hereinafter described in detail. Thus, choice of a proper value of resistance results in such a discharge of the delay line that, for example, the decrease in supply voltage resulting from a heavier load on the power supply when the pulse repetition is increased is compensated for by the shorter period of time in which the delay line may discharge.

In the accompanying figure, to which reference is now had, there is shown the proposed pulse modulator circuit comprising a pair of thyratron tubes 10 and 14; an inductance 13 and transformer 11 which are connected in series between the cathode of the tube 14 and the plate of the tube 10; a delay line 12 connected to the junction point 20 of inductance 13 and transformer 11; and a resistance 15 in shunt with tube 14. The cathode of the tube 10 is at ground potential and the grid is biased at such a negative voltage by the bias supply 19 and the resistance 17 that it is normally at cut-off potential. Since the supply voltage 21 is introduced at the plate of tube 14 and since a continuous circuit is formed to the plate of tube 10 (through resistance 15, inductance 13 and the primary winding of the transformer 11), the plate of tube 10 is normally at B+ potential. Thus the potential on the high side of the delay line 12, which is connected to the common terminal of the inductance 13 and transformer primary winding, is also at B+ potential and the low-side of the delay line is at ground potential. The resistance 18 serves as the load for the delay line 12 and has an impedance of such a value that the primary impedance of transformer 11 is equal to that of the delay line 12. The delay line 12 has an open-circuit impedance at its other end.

For purposes of explanation, consider that a keying pulse is introduced to the grid of the tube 10. This pulse may be formed in a keying pulse generator 22, of such precision that pulses accurately spaced in time with respect to each other will result. If the pulse has sufficient amplitude, it will cause the voltage on the grid of the tube 10 to rise above the cut-off level and the tube 10 will start to conduct, thus causing the plate to drop to a potential close to ground because of the low impedance across the thyratron tube 10 which occurs during its conduction period. The current through the tube 10 results from the discharge of the delay line 12 and this discharge passes through the primary winding of the transformer 11, inducing a voltage which appears across the load 18. The voltage at the terminal 20, which connects the high side of the delay line 12 to the junction point of the inductance 13 and the primary winding of the transformer 11, then drops to half of the voltage to which the line was charged since the primary impedance of transformer 11 is equal to the delay line impedance.

After the delay line 12 has exhausted its charge through the tube 10, the latter may not immediately stop conducting because of the large number of ions still present in the tube. Since a voltage difference exists all along the path comprising the power supply 21, resistance 15, inductance 13, transformer 11, tube 10 and through the ground path back to the grounded terminal of the power supply, current will flow. This current will tend to be of low frequency and thus no voltage will be induced in the pulse transformer 11 to appear across the load 18. Thus, it may be seen that the value of the resistance 15 and the resistances of the inductance 13, the transformer 11 and the tube 10 will control the amount of current which will flow. It may be further seen that the value of the resistance 15 will predominate and thus most of the voltage will appear across this resistance, thus causing the voltage at the cathode of the tube 14 to be fairly close to ground. As has been stated above, the resistance values of the inductance 13 and transformer 11 are low as compared to the value of the resistance 15 and thus the voltage difference existing between the cathode of the tube 14 and the plate of the tube 10 will be relatively low. Thus the potential at the anode of tube 10 remains low after the line is discharged and the tube will quench. After tube 10 stops conducting its anode will not immediately rise to B+ potential because terminal 20 can rise only as the delay line is charged through resistance 15. The plate of the tube 10 is connected to the grid of the tube 14, and the voltage difference, which now exists between grid and cathode of the tube 14, will be low enough to excite the tube 14 after tube 10 has quenched. The subsequent change in potential at the anode of tube 10 will not return it to a conducting state because of bias supply 19 connected to its grid. Once the tube 14 becomes excited, it presents a very low impedance. Additionally, the reactance of the inductance is chosen so that at some sufficiently high frequency it is in series resonance with the capacitive reactance presented by the delay line 12. Thus, a very low resultant impedance is presented by the circuit comprising the power supply 21, the tube 14, the inductance 13 and the delay line 12, and a high surge current results. This current drives the voltage at the terminal 20 to a maximum of twice the B+ voltage and cuts off the tube 14 since the cathode voltage is now higher than the plate voltage. As a result of the fact that the delay line potential is now higher than the potential of the power supply itself, the delay line is able to discharge slowly through a circuit comprising the inductance 13, the resistance 15 and the power supply, with the rate of discharge depending mainly upon the value of the resistance 15. If the resistance 15 is chosen to be very large, negligible discharge will take place in the delay line 12 before the arrival of the next pulse at the grid of tube 10 fires the tube and discharges the line. If the resistance 15 is made to have some smaller value, however, the delay line potential is able to decrease somewhat before the next pulse. Assume now that the pulse repetition rate is increased. Because of the increased load on the power supply and the poor voltage regulation that may exist in the power supply, the available B+ voltage will decrease. This decrease in the available B+ voltage will in turn cause the overshoot of voltage at the terminal 20, which occurs from the conduction of the tube 14 after the delay line 12 has discharged, to be less than usual, since the amount of overshoot is proportional to the B+ voltage available. This decrease in the overshoot voltage is compensated for, however, by the fact that the delay line potential is not able to decrease as much with higher repetition rates from discharge through the power supply as would occur with lower repetition rates, the reason for this being that the time interval between pulses is less for higher repetition rates. It may thus be seen that by inserting a fairly low value for the resistance 15, a pulse may be formed whose amplitude will be substantially constant regardless of the pulse repetition rate or the quality of voltage regulation in the power supply.

While a certain preferred embodiment of this invention has been described, it is realized that many modifications and variations of this invention may be made and no limitations upon this invention are intended other than may be imposed by the scope of the appended claims.

What is claimed is:

1. A pulse generator for producing variable frequency pulses having substantially constant amplitude from a power supply having poor voltage regulation, said pulse generator comprising a transmission line section, a resonant charging path including a first switch tube for charging said line from said power supply to substantially twice the power supply voltage, a discharge path for said line including an output transformer and a second switch tube, pulse frequency control means operative to repetitively excite said second switch tube at the desired output pulse frequency, coupling means coupling said second switch tube to said first switch tube operative to excite said first tube at the conclusion of each line discharge through said second tube, and resistance means shunting said first switch tube operative to discharge said line towards the voltage of the power supply during the interval between the charging of said line and the next successive discharging thereof.

2. A pulse generator for producing variable frequency pulses having substantially constant amplitude from a power supply having poor voltage regulation, said pulse generator comprising a transmission line section, a series resonant charging path for charging said line from said power supply to substantially twice the power supply voltage, said charging path including a first switch tube and an inductance in series, the inductance being at the line end of said series path, a discharge path for said line including an output transformer and a second switch tube, pulse frequency control means operative to repetitively excite said second switch tube at the desired output pulse frequency, coupling means coupling said second switch tube to said first switch tube operative to excite said first tube at the conclusion of each line discharge through said second tube, and resistance means shunting said first switch tube and cooperatively associated with said inductance to discharge said line towards the voltage of said power supply during the interval between the charging of said line and the next successive discharging thereof.

THOMAS C. HANA.

REFERENCES CITED

The following references are of record in the file of this patent:

UNITED STATES PATENTS

| Number | Name | Date |
| --- | --- | --- |
| 2,405,070 | Tonks | July 30, 1946 |
| 2,409,897 | Rado | Oct. 22, 1946 |
| 2,416,114 | Nelson | Feb. 18, 1947 |